(12) United States Patent
Claise et al.

(10) Patent No.: US 7,788,371 B2
(45) Date of Patent: Aug. 31, 2010

(54) EXPORTING MANAGEMENT INFORMATION BASE DATA USING IPFIX

(75) Inventors: Benoit Claise, Crisnee (BE); Paul Aitken, Peebleshire (GB); Andrew Johnson, Scottish Borders (GB)

(73) Assignee: Cisco Technology, Inc., San Jose, CA (US)

( * ) Notice: Subject to any disclaimer, the term of this patent is extended or adjusted under 35 U.S.C. 154(b) by 589 days.

(21) Appl. No.: 11/724,762

(22) Filed: Mar. 15, 2007

(65) Prior Publication Data

US 2007/0217425 A1 Sep. 20, 2007

Related U.S. Application Data

(60) Provisional application No. 60/784,333, filed on Mar. 20, 2006.

(51) Int. Cl.
G06F 15/173 (2006.01)
(52) U.S. Cl. .................. 709/224; 709/223; 370/392; 370/235; 370/232
(58) Field of Classification Search .............. 709/223, 709/224; 370/392, 235, 232
See application file for complete search history.

(56) References Cited

U.S. PATENT DOCUMENTS

| | | | |
|---|---|---|---|
| 6,694,304 B1 * | 2/2004 | Sethi | 707/2 |
| 6,704,780 B1 * | 3/2004 | Sethi | 709/223 |
| 7,120,689 B2 * | 10/2006 | Gonsalves et al. | 709/224 |
| 7,143,006 B2 * | 11/2006 | Ma et al. | 702/179 |
| 7,385,924 B1 * | 6/2008 | Riddle | 370/235 |
| 7,487,541 B2 * | 2/2009 | Robert | 726/22 |
| 7,562,140 B2 * | 7/2009 | Clemm et al. | 709/224 |
| 7,580,356 B1 * | 8/2009 | Mishra et al. | 370/230.1 |
| 7,580,936 B2 * | 8/2009 | Salgado | 1/1 |
| 7,606,895 B1 * | 10/2009 | Dini et al. | 709/224 |
| 7,639,613 B1 * | 12/2009 | Ghannadian et al. | 370/232 |
| 2003/0192047 A1 * | 10/2003 | Gaul et al. | 725/39 |
| 2003/0212767 A1 * | 11/2003 | Yang-Huffman | 709/220 |
| 2004/0105394 A1 * | 6/2004 | Martinot et al. | 370/252 |
| 2006/0217923 A1 | 9/2006 | Ma et al. | |
| 2006/0230060 A1 * | 10/2006 | Salgado | 707/103 R |
| 2006/0285501 A1 * | 12/2006 | Damm | 370/252 |
| 2007/0112955 A1 * | 5/2007 | Clemm et al. | 709/224 |

(Continued)

OTHER PUBLICATIONS

Stephan et al, Method and System for the Transfer of Communication Network Administration Information, WO 2005/034429, Published Apr. 14, 2005, pp. 1-77.*

(Continued)

*Primary Examiner*—Dohm Chankong
(74) *Attorney, Agent, or Firm*—Hickman Palermo Truong & Becker LLP

(57) ABSTRACT

In one embodiment, a networking device includes logic encoded in one or more tangible media for execution and when executed operable to cause performing receiving a command to collect a unique object identifier that represents a unique management information base (MIB) object; retrieving, in response to receiving the command, a Simple Network Management Protocol (SNMP) MIB variable or table that corresponds to the MIB object; creating an Internet Protocol Flow Information Export (IPFIX) template data structure that includes the object identifier; in which the object identifier is encoded in the IPFIX template data structure as a string that has a variable length; and exporting the encoded object identifier with the variable length string.

21 Claims, 4 Drawing Sheets

U.S. PATENT DOCUMENTS

| | | | |
|---|---|---|---|
| 2007/0147246 A1* | 6/2007 | Hurley et al. | 370/232 |
| 2007/0192448 A1* | 8/2007 | Sankaran | 709/220 |
| 2007/0274213 A1* | 11/2007 | Stephan et al. | 370/235 |
| 2008/0307080 A1* | 12/2008 | Stephan | 709/223 |

OTHER PUBLICATIONS

Claise, et al., "IPFIX Protocol Specification," Mar. 2004, IPFIX working group, pp. 1-60.*

Sadasivan et al., "Architecture for IP Flow Information Export," Jun. 2004, IP Flow Information Export WG, pp. 1-34.*

Quittek et al., "Requirements for IP Flow Information Export," Sep. 2002.*

Calato et al, "Information Model for IP Flow Information Export," Nov. 21, 2003.*

Zseby et al, "IPFIX Applicability," Jul. 2004, downloaded Apr. 30, 2010 from: http://tools.ietf.org/html/draft-ietf-ipfix-as-02, 16 pages.*

Norseth et al, "IPFIX Data Model: Data Model for IP Flow Information Export," Aug. 2002, downloaded Apr. 30, 2010 from: http://tools.ietf.org/pdf/draft-ietf-ipfix-architecture-00.pdf, 26 pages.*

Kobayashi et al, "Managed Objects for IPFIX concentrator," Mar. 2, 2006, downloaded Apr. 30, 2010 from: http://tools.ietf.org/html/draft-kobayashi-ipfix-concentrator-mib-01, 51 pages.*

Stephan et al, "Network Management Method, a System and a Device," WIPO Pub. No. WO/2006/045918. Published Apr. 6, 2006, 31 pages.*

Claise B, "Cisco Systems Netflow Services Export Version 9," IETF Request for Comments (RFC) 3954, Oct. 2204, Internet Engineering Task Force, 27 pages.

Anonymous, "IP Flow Information Export (ipfix)," downloaded Nov. 26, 2007 from www.ietf.org/html.charters/ipfix-charter.html, Internet Engineering Task Force, 4 pages.

Anonymous, "Packet Sampling (psamp)," downloaded Nov. 26, 2007 from www.ietf.org/html.charters/ipfix-charter.html, Internet Engineering Task Force, 4 pages.

Anonymous, "IP Performance Metrics (ippm)," from www.ietf.org/html.charters/ippm-charter.html, Internet Engineering Task Force, 5 pages.

Anonymous, "Next Steps in Signaling (nsis)," from www.ietf.org/html.charters/nsis-charter.html, Internet Engineering Task Force, 3 pages.

Quittek J et al., "Information Model for IP Flow Information Export," Internet-draft draft-ietf-ipfix-info-11.txt, Internet Engineering Task Force, Sep. 22, 2005, 141 pages.

Claise B, "IPFIX Protocol Specification," Internet-draft draft-ietf-ipfix-protocol-19.txt, Internet Engineering Task Force, Sep. 2005, 64 pages. (see especially: enterprise information elements).

* cited by examiner

EXPORTING MANAGEMENT INFORMATION BASE DATA USING IPFIX

PRIORITY CLAIM

This application claims the benefit of provisional application 60/784,333, filed Mar. 20, 2006, the entire contents of which are hereby incorporated by reference for all purposes as if fully set forth herein.

TECHNICAL FIELD

The present disclosure relates generally to network management.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

IP (Internet Protocol) Flow Information eXport (IPFIX) is a protocol based on Cisco NetFlow version 9, which is defined in the Internet Engineering Task Force (IETF) Request for Comment (RFC) 3954. IPFIX is currently at the final phase of standardization at the IETF. IPFIX could be considered as NetFlow version 10. The Working Group home page is accessible at: http://www.ietf.org/html.charters/ipfix-charter.html.

The IPFIX protocol defines how IP Flow information can be exported from routers, measurement probes or other devices. IP Flow information can be used as input to various applications. IPFIX is a general data transport protocol, easily extensible to suit the needs of different applications. IPFIX provides appropriate Information Elements (IEs) for various IP versions. A text-based draft of the IPFIX Information Element draft is accessible at (http://www.ietf.org/internet-drafts/draft-ietf-ipfix-info-13.txt).

Information Elements of the IPFIX information model are grouped into 12 groups according to their characteristic semantics and their applicability. These groups are listed in Table 1, below.

TABLE 1

| GROUP NO. | SEMANTICS/APPLICABILITY |
| --- | --- |
| 1 | Identifiers |
| 2 | Metering and Exporting Process Configuration |
| 3 | Metering and Exporting Process Statistics |
| 4 | IP Header Fields |
| 5 | Transport Header Fields |
| 6 | Sub-IP Header Fields |
| 7 | Derived Packet Properties |
| 8 | Min/Max Flow Properties |
| 9 | Flow Time Stamps |
| 10 | Per-Flow Counters |
| 11 | Miscellaneous Flow Properties |
| 12 | Padding |

Information Elements that are derived from fields of packets or from packet treatment, such as the Information Elements in groups 4-7 of Table 1, may function as Flow Keys used for mapping packets to Flows. For Information Elements that are not functional as Flow Keys, values associated therewith may change from packet to packet, within a single Flow. For Information Elements with values that are derived from fields of packets or from packet treatment and for which the value may change from packet to packet within a single Flow, the IPFIX information model defines their value as determined by the first packet observed for the corresponding Flow, unless the description of the Information Element (IE) explicitly specifies a different semantics. This attribute allows writing all Information Elements (IEs) related to header fields once when the first packet of the Flow is observed. For further observed packets of the same Flow, Flow properties that depend on more than one packet, such as the Information Elements in groups 8-11, are updated. Information Elements with a name having the "post" prefix, for example, "postClassOfServiceIPv4", report properties that are retrieved by various means within an Observation Domain, instead of properties that are observed at the Observation Point. These information Elements are usable where "middlebox" functions within the Observation Domain change Flow properties after packets passed the Observation Point.

By its design, IPFIX may export many different information elements, not just flow related ones. Several protocols have shown interest in using IPFIX. For example, the Packet Sampling protocol (PSAMP: http://www.ietf.org/html.charters/psamp-charter.html) uses IPFIX for the export of packet related information elements. The IP Performance Metrics Working Group (IPPM: http://www.ietf.org/html.charters/ippm-charter.html) proposed a way to export IP Service Level Agreement (SLA) metrics with IPFIX. The Next Steps in Signaling Working Group (NSIS: http://www.ietf.org/html-.charters/nsis-charter.html) also investigated IPFIX as an export protocol.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
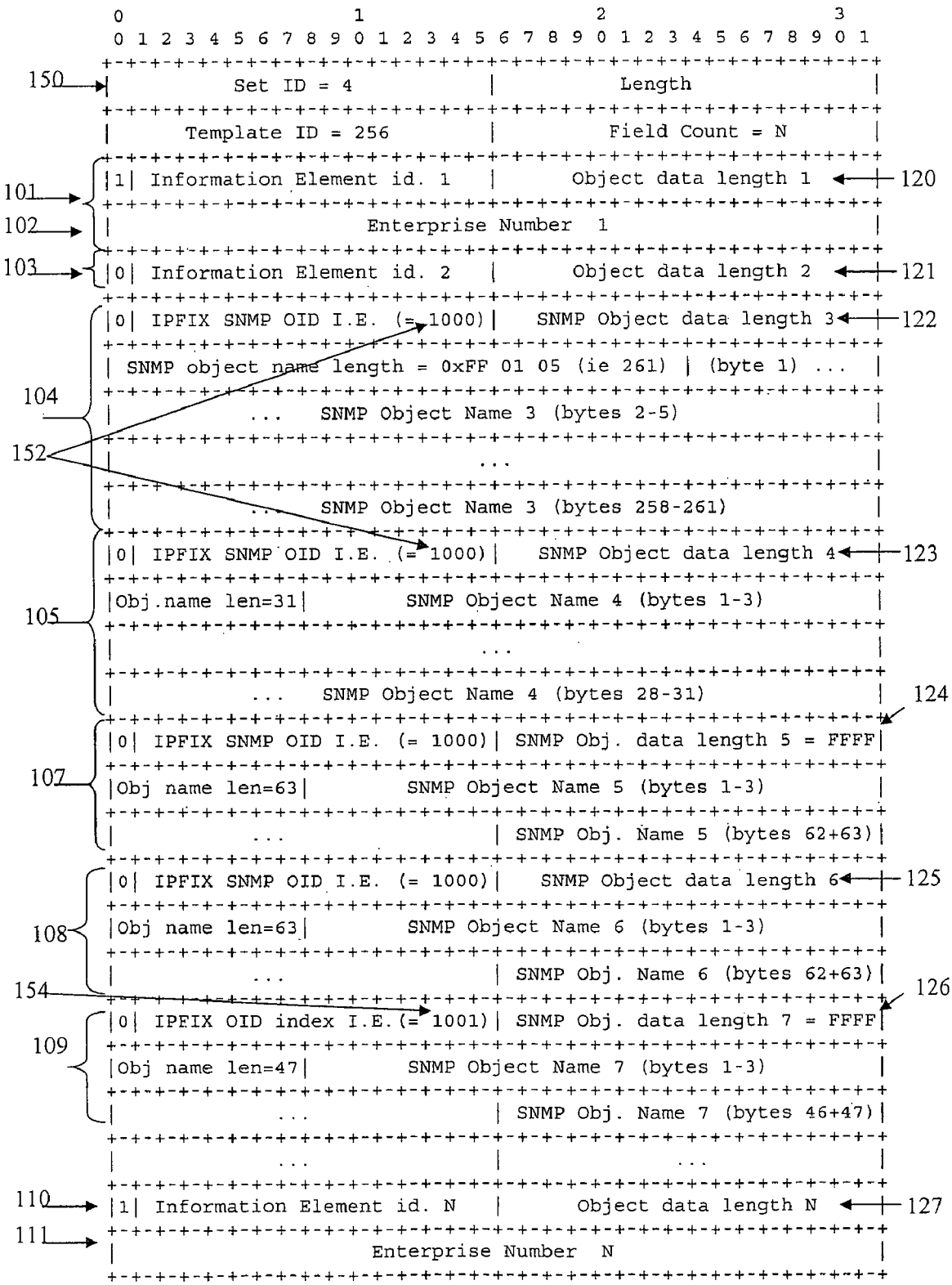
FIG. 1 illustrates an example Template Record.

Example embodiments for exporting management information base (MIB) variables using the IPFIX Protocol are described. In the following description, for the purposes of explanation, numerous specific details are set forth in order to provide a thorough understanding. It will be apparent, however, to one skilled in the art that the present invention may be practiced without these specific details. In other instances, well-known structures and devices are shown in block diagram form in order to avoid unnecessarily obscuring the present invention.

Overview

In present practice, several information elements are already exported with IPFIX. For example, flow related information elements can be exported, as described in the IPFIX Information Element draft, which is accessible at (http://www.ietf.org/internet-drafts/draft-ietf-ipfix-info-13.txt). It should be understood that this IPFIX Information Element draft is a work of the IETF that is in current progress and awaiting implementation as an RFC thereof. A copy of the IPFIX Information Element draft is included in an appendix to this disclosure and is hereby incorporated by reference for all purposes as if fully set forth herein. As another example, time related information elements can be exported, for instance, as described in the IPFIX Information Element draft.

MIBs are used to manage network interfaces for internetworking. For instance, IETF RFC 2863 describes managed objects for managing network interfaces, and thus defines a portion of a MIB that is useful with network management protocols. For example, the object 'ifIndex' is one such managed object. The value of an ifIndex object corresponds to an IP interface at which network traffic flow packets are received. An ifIndex value is assigned to any interface in an interface stack. Another example is flow timestamps, such as the 'sysUptime' timestamp, as in MIB OID .iso.org.dod.internet.mib-2.system.sysUpTime.0. The IPFIX Information Element Draft describes both 'flowStart' and 'flowEnd' sysUptime timestamps, which relate packet flow times relative to the last initialization or re-initialization of an IPFIX network device.

An information element (IE) that duplicates an existing MIB variable can be exported using NetFlow version 9. For example, the 'ifName' IE exports the ifname (RFC2233) MIB variable.

Current technical developments indicate is that IPFIX will be widely used in the future for any accounting and performance "push" model. In this context, a "push" model is a mechanism with which network elements export data to management elements, rather than storing data for later retrieval by management elements, essentially a "pull" model. The Simple Network Management Protocol (SNMP) uses a pull model.

IPFIX requires that each information element must be defined, with a procedure defined in the "IANA Considerations" section of the IPFIX Information Model draft (http://www.ietf.org/internet-drafts/draft-ietf-ipfix-info-11.txt). Enterprises may define information elements without registering them with IANA by conforming to the enterprise specific information elements (see the IPFIX Protocol Draft http://www.ietf.org/internet-drafts/draft-ietf-ipfix-protocol-19.txt). The IPFIX IANA registration is basically a process for the definition of a new information model, which could be used within the IPFIX protocol.

However, many information elements, possibly thousands, have already been defined in connection with deployment of SNMP MIBs. To define new information elements in IPFIX for variables that are already fully specified in MIB definitions and have been in use for a long time may thus confront network administrators with the possibility of a daunting task.

Moreover, the magnitude of the task may be exacerbated by the inefficiency and wastefulness that can be inherent in redefining that which is already well defined. Further, the possibility of confusion, errors, delays and efforts related to replacing familiar MIB elements with new, separate IPFIX variables arises with such a repetitive effort.

Embodiments relate to exporting management information base (MIB) variables using the IPFIX Protocol. In one embodiment, a command is received to collect a unique object identifier that represents a unique MIB object. Responsively, a Simple Network Management Protocol (SNMP) MIB variable or table is retrieved that corresponds thereto. An IPFIX Template Record data structure is created that includes the object identifier. The object identifier is encoded therein as a fixed or variable length string and exported in an IPFIX Template Record. The corresponding object value is exported in a Data Record corresponding to that Template.

Embodiments thus allow exporting the values of MIB variables within the IPFIX protocol. Embodiments obviate a network administrator needing to define new information elements in IPFIX for the many MIB variables that are already fully specified in MIB definitions, well established and have been in use for a long time.

According to one embodiment, the current IPFIX protocol is modified. The conventional approach delineated in the IPFIX Protocol Specification uses a Template Record or Option Template Record to export an IPFIX Information Element identifier (ID), which characterizes the information element to export. In contrast, embodiments function to export the corresponding familiar and well-established SNMP Object ID (OID) is exported, instead. The SNMP OID is a unique object identifier representative of a unique MIB variable, and is already specified in MIB definitions.

Embodiments are applicable to any implementation of IPFIX and all other systems, applications or protocols that use IPFIX as an export protocol. The approach described herein, with reference to the example embodiments, resolves issues relating to conventional approaches. For example, no duplication is required for the many information elements that are already defined in MIB definitions, as well as for proprietary MIB definitions. Correspondingly, the IPFIX information model is spared from being overloaded with information elements that have already been well specified elsewhere. Further, there is no need to maintain, understand and/or cross-reference different definitions that actually relate to the same substantive data and considerable effort is spared and resources conserved.

As an example, NetFlow version 9 exports the 'ifName' MIB variable. To conventionally export values of that variable using IPFIX, a new information element representing the exact definition of the ifName variable first had to be created in the IPFIX information model. Embodiments preclude such re-definition.

Another example involves the export of IP service level agreement (SLA) parameters, which are already defined in the MIB named CISCO-RTTMON-MIB. Using embodiments obviates the conventional requirement to redefine the same MIB variables as IPFIX information elements for use in the IPFIX information model.

Example IPFIX Template Record

FIG. 1 depicts data organization for an example Template Record 100, according to an embodiment. FIG. 1 uses the Template Record Example from the IPFIX protocol specifications, and specifies one way to improve it in order to support the mix of IPFIX information elements and SNMP managed object exports.

The first information element is an IPFIX information element 101, with an enterprise number labeled 102 specified as "Enterprise Number 1" and a length labeled 120.

The second information element is an IPFIX information element 103, without a specified enterprise number, having a length labeled 121.

The third information element is an SNMP managed object 104, not part of a table, with a length labeled 122 specified by the Structure of Management Information (SMI) SMIv2 (RFC 2578) type of the SNMP managed object.

The example object name length for SNMP managed object 104 reads "SNMP object name length=0xFF 01 05 (ie 261)" in which the first byte is marked with a reserved value, '0xFF'. This scheme reflects "Variable Length Information Element" encoding, as described in Section 7 of the IPFIX Protocol, draft-ietf-ipfix-protocol-24, which is hereby incorporated by reference in its entirety for all purposes as if fully set forth herein. This example indicates that the following two bytes contain a 16-bit length, which allows encoding lengths that may range from zero (0) to 65,535. In contrast, single byte length encoding spans a smaller range of 254 lengths, as from zero (0) to 255, in which '255' comprises a reserved marker for the value '0xFF'.

The fourth information element is an SNMP managed object 105, not part of a table, with a length labeled 123 specified by the SMIv2 type of the SNMP managed object.

The fifth information element is an SNMP managed object 107, not part of a table, with a length labeled 124 specified by a variable length encoding 125.

The sixth and seventh information elements (108 and 109, respectively) are two elements of an SNMP MIB table. The sixth information element 108 is a managed object variable, while the seventh information element 109 is the index, or concatenated list of indices, of the information element 108. The length of the sixth information element 108 is defined by the SMIv2 type of the SNMP managed object. In an embodiment, a seventh information element 109 uses variable length encoding 126. In an embodiment, the lengths of the various objects, elements, etc. are thus included with the fields 120-127, instead of the MIB definition SMI.

An Nth information element 110 is an IPFIX information element, with an enterprise number 111 specified as "Enterprise Number 'N'."

An implementation uses a set ID that is assigned by the IPFIX working group. As an example, the set ID of "4" (shown at element no. 150 of FIG. 1) is used herein, but any other value can be used that is compatible with an implementation of IPFIX.

An implementation uses an IPFIX Information Element for "SNMP OID name" that is assigned by the IPFIX working group. As an example, the value of "1000" (shown at element no. 152 of FIG. 1) is used herein, but any other value can be used that is compatible with an implementation of IPFIX.

An implementation uses an IPFIX Information Element for "SNMP OID index" that is assigned by the IPFIX working group. As an example, the value of "1001" (shown at element no. 154 of FIG. 1) is used herein, but any other value can be used that is compatible with an implementation of IPFIX.

In alternative embodiments, other combinations (fixed length and/or variable length, an SNMP managed object being part of a table or not, enterprise numbers present or not, etc.) than the ones specified in the preceding description are possible. In an embodiment, one or more selected, special or otherwise unique characters, such as a question mark '?' or the like, may be used to reference a value from an indexed table, in which the index identity, location, address, etc. are of no particular relevance, interest, significance or the like.

In an embodiment, the field length value for an SNMP managed object is a variable length, or depends on an SMIv2 type of the SNMP managed object. Further, where an IPFIX SNMP OID information element (e.g., value 1000) is followed by a single IPFIX Index information element (e.g., 1001), the concatenation of 1000, 1001 should be reported as a single MIB variable, in which the IPFIX Index information element value (1001) functions as a table index for the information element 1000. With multiple indices in the table, the concatenation of the MIB indices is reported in the information element value labeled 154.

In a first alternate embodiment, a fixed length OID of N bytes is exported, padded with ASCII NUL characters. In this embodiment, the last managed object name in the SNMP OID is optionally sent. In a second alternative, all currently defined IPFIX information elements are converted into MIB variables in order to export only SNMP objects. The second alternative simplifies the export format, as no more IPFIX information elements would be required. However, the IPFIX "float" data type does not correspond to any equivalent SMIv2 data type. An implementation addresses this incompatibility, e.g., with an alternative configuration, encapsulation or another workaround. In another embodiment, a single IPFIX Information Element can contain the full OID of a MIB table, including the MIB variable index (e.g., in contrast to a combination of elements 1000 and 1001), for example:

<!—[if !supportLists]—><!—[endif]—>.

Example Process for Exporting MIB Variables Using the IPFIX Protocol

Figure 2:
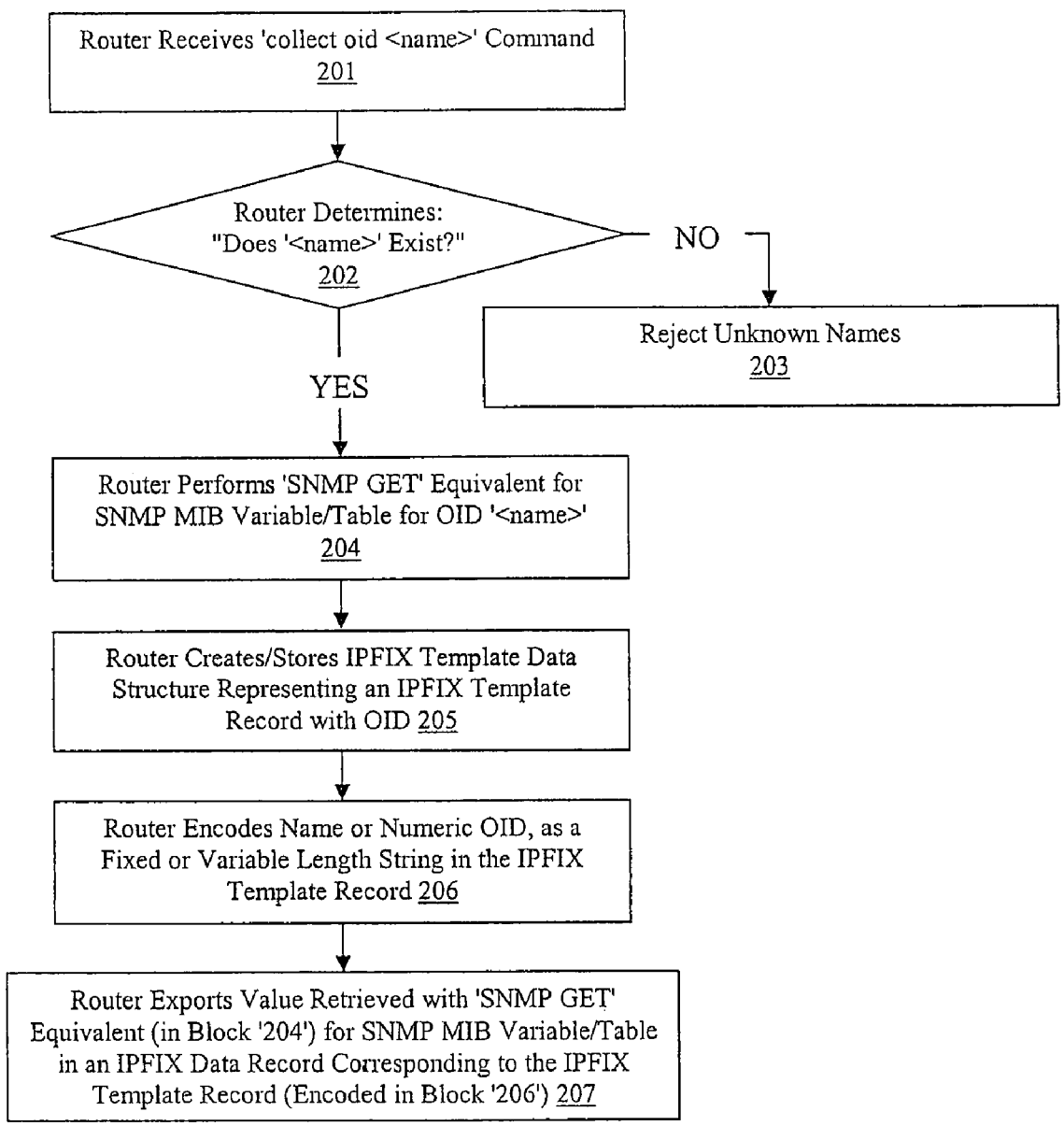
FIG. 2 illustrates an example method for exporting MIB variables using the IPFIX protocol.

FIG. 2 depicts a flowchart for an example process 200 for exporting MIB variables using the IPFIX Protocol. For purposes relating to example and not limitation, process 200 is described with reference to an example router. However, process 200 may be performed with any managed packet switching network element, including networking devices such as routers and switches, but not limited thereto.

In block 201, a router implementing process 200 receives an example command-line interface (CLI) command that is defined as "collect oid <name>", where "name" comprises any MIB identifier and 'oid' refers to an object identifier. According to this embodiment, in response to receiving the "collect" CLI command, the router in block 202 checks to determine whether a MIB object with the name specified with the command exists. If the name does not exist, the router rejects unknown names in block 203. "Name" also may comprise any OID number.

Where the router determines that the name specified with the command exists, the router implementing this embodiment executes block 204. The router internally performs an operation that is essentially equivalent to an 'SNMP GET' operation for the SNMP MIB variable or table corresponding to the "name" provided in the CLI command. One or more application programming interfaces (APIs) may be used with the operation herein to retrieve the SNMP MIB variable or table corresponding to the "name" provided in the CLI command. In one embodiment, one or more of the same APIs are utilized in the retrieval operation herein, which would be used to execute a conventional SNMP GET operation.

In block 205, the router implementing this embodiment creates, and may also store, a data structure that represents an IPFIX Template Record that includes the OID (e.g., either a name or number). The OID is encoded as a string, for instance in a Unicode Transformation Format (UTF) such as a UTF-8 string. Other encoding formats may be used. The example IPFIX Template Record 100 (FIG. 1) comprises an example of such a Template Record data structure. The size of the encoded string is provided as a prefix to the string using IPFIX variable length encoding, as described in section 7 ('Variable Length Information Element') of IPFIX-PROTO, the IPFIX Protocol draft, which is available at (http://www.ietf.org/internet-drafts/draft-ietf-ipfix-protocol-19.txt) and in the IPFIX implementation guidelines, available at (http://www.ietf.org/internetdrafts/draft-ietf-ipfix-implementation-guidelines-01.txt), both of which are incorporated herein for all purposes, in section 7 ('Variable Length Information Element'). Using a variable length field in the Template Record, as depicted with the example element numbers 104, 105, 107 and 108 (FIG. 1), allows an implementation to choose to specify an index. Further, as much or as little of the full path of the SNMP object name can be included as necessary, appropriate or desired in that implementation. Example values for the SNMP object name are listed in Table 2, below.

TABLE 2

| EXAMPLE SNMP OBJECT NAMES | EXPLANATION |
| --- | --- |
| "packetArrivalTime.0" | Time the first packet arrived. |
| "sysId" | Simply the last element. |
| "cisco.netflow.foobar" | partial path |
| ".iso.dod . . . " | full path |

In block 206, a router implementing this embodiment then exports either the name or the numeric OID, encoded as a variable length string in an IPFIX Template Record.

In one embodiment, an implementation assumes that endpoint names are unique, in the case of non-indices. The English (or e.g., another natural language or similarly or alternatively descriptive) name of the last part of the OID is used in case of non-indices in one implementation.

In block 207, the value retrieved in block 204 is exported from the router in an IPFIX Data Record corresponding to the IPFIX Template that was exported in block 206.

SNMP messages generated asynchronously, as with an SNMP trap, may also be embedded in an IPFIX message.

Example System for Exporting MIB Variables Using the IPFIX Protocol

Figure 3:
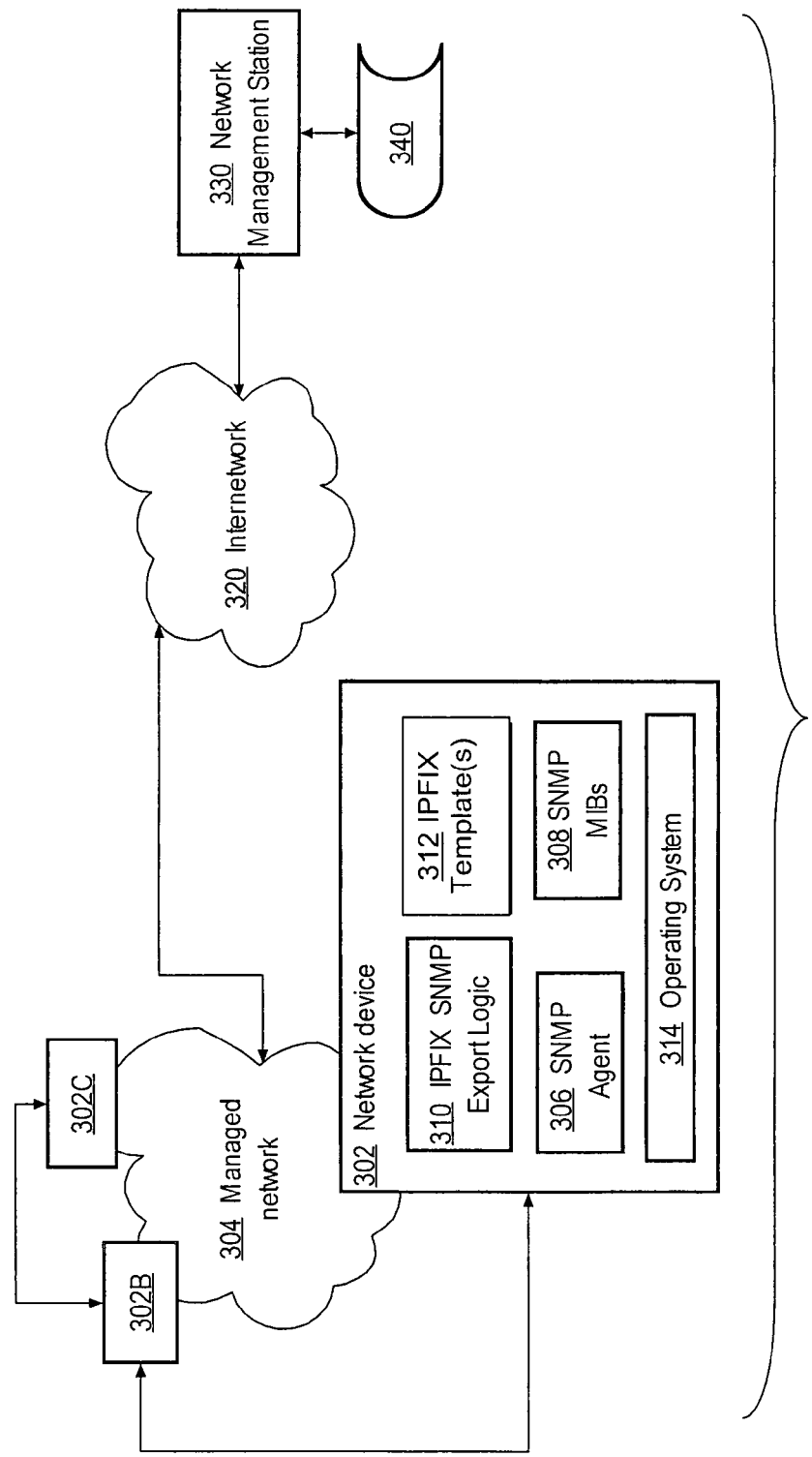
FIG. 3 illustrates an example system for exporting MIB variables using the IPFIX Protocol.

FIG. 3 depicts an example system 300 for exporting MIB variables using the IPFIX Protocol. A managed network 304 comprises multiple managed network elements, including example network devices 302, 302B, 302C and perhaps others. Managed network 304 comprises a packet switched network. Each of the network devices 302, 302B and 302C comprises a network infrastructure element such as a router, switch, etc. Managed network 304 is coupled, directly or indirectly, through one or more internetworks 320 to a network management station (NMS) 330. NMS 330 has an associated network management database 340. The network management station 330 hosts one or more network management applications for configuring, polling, monitoring, and otherwise managing the devices in the managed network 304. The network management station 330 stores information about device inventory, configuration, monitored variables, etc., in network management database 340.

It should be clearly understood that system 300 and its components are shown by way of an example illustration and not by any means, by way of any sort of limitation. In fact, the network technology with which an embodiment is implemented is, in a sense, not especially significant or relevant; embodiments are well suited to implementation with a wide variety of network technology. For instance, an embodiment may be implemented in which the NMS is more or less directly coupled to a network device. For another example, an embodiment may be implemented in which the NMS is resident within the same device (e.g., a workstation or another computer) with a network device. For yet another example, an embodiment may be implemented in which the NMS may store information with other than a database. With this understanding clearly in mind, the description of the example implementation depicted with system 300 in FIG. 3 continues as follows.

Figure 4:
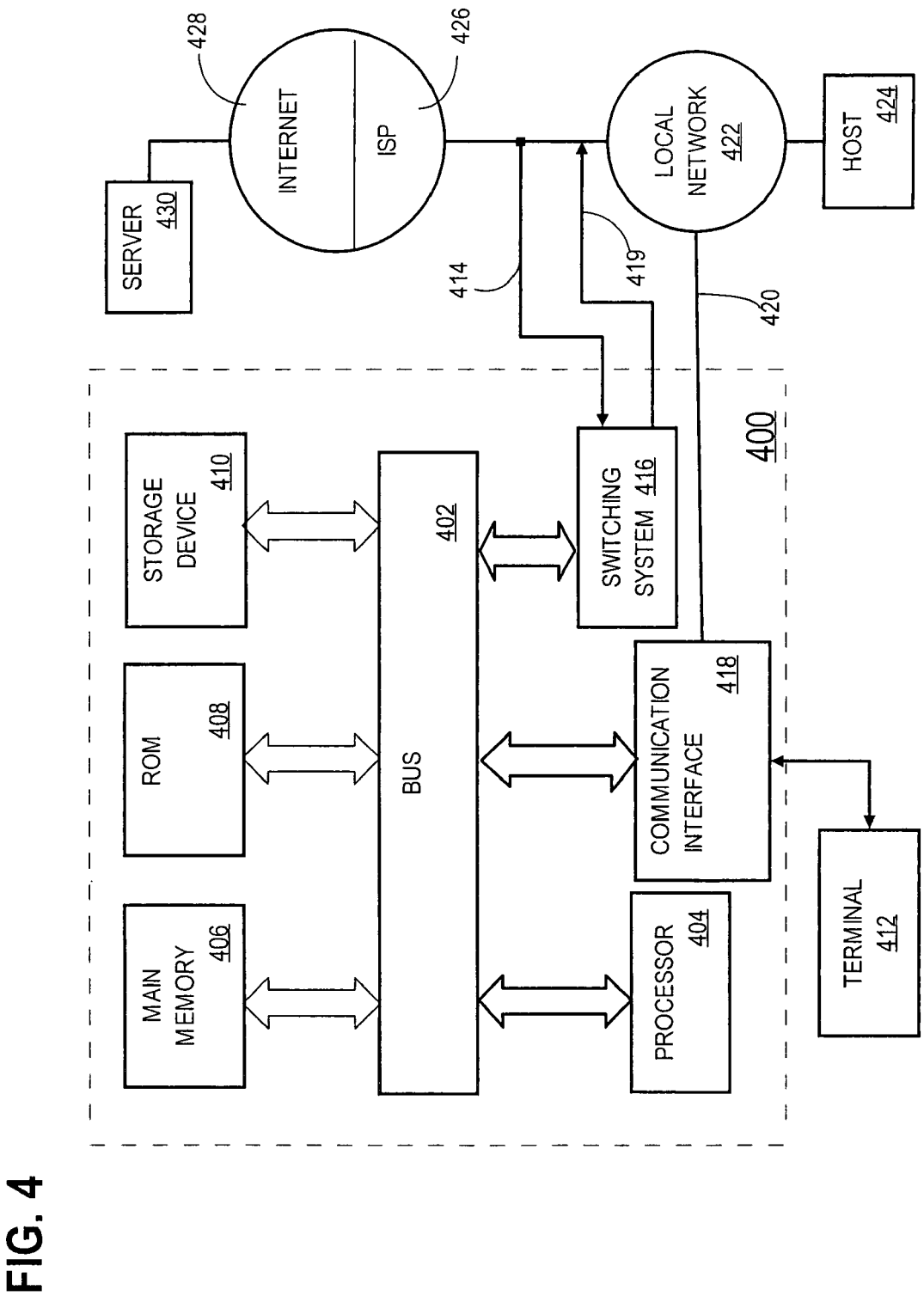
FIG. 4 illustrates an example computer system upon which an embodiment may be implemented.

Each of the network devices 302, 302B, 302C, etc. may have a general internal structure as shown in FIG. 4 and described further below. In an embodiment, at least one of the network devices, e.g., network device 302, of managed network 304 implements IPFIX with an approach as described herein. The software architecture shown in FIG. 3 is used in one implementation to implement IPFIX.

As an example, network device 302 hosts an operating system 314, an SNMP agent 306, one or more SNMP management information bases (MIBs) 308, IPFIX SNMP Export Logic 310, and one or more IPFIX Templates 312, such as is described in the IPFIX Protocol Draft (http://www.ietf.org/internet-drafts/draft-ietf-ipfix-protocol-19.txt). The operating system 314 supervises higher-level software elements and controls access to hardware resources (e.g., as described below with reference to FIG. 4).

SNMP agent 306 implements simple network management protocol (SNMP). The SNMP MIBs 308 store values for SNMP variables. The stored values relate to device performance, configuration, and applications, etc.

The IPFIX SNMP Export Logic 310 implements the structure and function described in the IPFIX specifications described above and as further described herein. Thus, logic 310 implements the functions described above for exporting values of SNMP variables that are stored in MIBs 308, without redefining such variables in new IPFIX information elements. The IPFIX Template Records 312 comprise data export definitions for export operations. Logic 310 can export SNMP variable values from MIBs 308 to systems or applications that are external to network device 302, such as NMS 330, or in other embodiments, internal to network device 302 or a more or less all-in-one device, e.g., in which an NMS resides within the network device.

Example Computer System Hardware

FIG. 4 depicts an example computer system 400, upon which an embodiment may be implemented. An example embodiment is implemented using one or more computer programs running on a network element, such as a packet switching router or switch device, in a packet switched network. In this example embodiment, the computer system 400 represents a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface, a Universal Serial Bus (USB) device, a FireWire (IEEE 1394, a standard of the Institute of Electrical and Electronic Engineers, Inc.) type device or another interface or related device. An external terminal 412 or other computer system connects to the computer system 400 and provides commands to it using the interface 418. Firmware or software running in the computer system 400 provides a terminal interface or character-based command interface, a graphical user interface (GUI) or another interface, so that external commands can be given to the computer system.

A switching system 416 is coupled to bus 402 and has a plurality of input interfaces 414 and a plurality of output interfaces 419 to one or more external network elements. The external network elements may include a local network 422 coupled to one or more hosts 424, or a global network such as Internet 428 having one or more servers 430. The switching system 416 switches information traffic arriving on input interfaces 414 to output interfaces 419 according to predetermined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for exporting management information base (MIB) variables using the IPFIX protocol. According to one embodiment of the invention, exporting management information base (MIB) variables using the IPFIX protocol is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic waves, light waves or other electromagnetic radiations, such as those generated during radio wave (e.g., Bluetooth and other wireless modalities, etc.), microwave, infrared and other optical data communications.

Common forms of computer-readable media include, for example, a floppy disk, a flexible disk, hard disk, magnetic tape, or any other magnetic medium, a CD-ROM, DVD or any other optical medium, punch cards, paper tape, another legacy or any other physical medium with patterns of holes, darkened spots, lines or other configurations, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions.

The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a digital subscriber line (DSL), cable or other modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such application provides for exporting management information base (MIB) variables using the IPFIX protocol as described herein.

The received code may be executed by processor 404 as it is received, and/or stored in storage device 410, or other non-volatile storage for later execution. In this manner, computer system 400 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A networking apparatus, comprising:
   a network interface;
   a processor coupled to the interface;
   logic coupled to the processor and encoded in one or more tangible storage media for execution and when executed operable to cause performance of computer implemented steps that comprise:
   receiving a command to collect a unique object identifier that represents a unique management information base (MIB) object;
   wherein the unique object identifier is a MIB object identifier (OID);

retrieving, in response to receiving the command, a Simple Network Management Protocol (SNMP) MIB variable or table that corresponds to the MIB object;

creating an Internet Protocol Flow Information Export (IPFIX) template record data structure that includes the object identifier;

wherein the object identifier is encoded in the IPFIX template data structure as a string;

wherein the string has a variable length; and exporting the IPFIX record data structure with the encoded object identifier;

wherein an object value that corresponds to the object identifier that is encoded in the IPFIX template record data structure is exported with the IPFIX record data structure; and wherein the receiving and exporting steps support a push transmission mode for exporting unsolicited data;

wherein a size of the string is encoded therewith as a prefix, which comprises a variable length information element that conforms to IPFIX variable length encoding.

2. The apparatus as recited in claim 1 further comprising logic which when executed causes storing the IPFIX template record.

3. The apparatus as recited in claim 1 wherein the variable length string conforms to one of a plurality of encoding formats wherein the plurality includes one or more Unicode transformation formats.

4. The apparatus as recited in claim 3 wherein the one or more Unicode transmission formats comprise Unicode Transformation Format 8 (UTF-8).

5. The apparatus as recited in claim 1 wherein the size of the string is stored separately from the apparatus.

6. The apparatus as recited in claim 1 wherein the strings comprise NULL terminated strings.

7. The apparatus as recited in claim 1 wherein content of the variable length string that corresponds to the object identifier encodes a name or a number.

8. The apparatus as recited in claim 1 further comprising logic which when executed causes retrieving using a SNMP 'GET' operation.

9. The apparatus as recited in claim 8 wherein the logic, when executed, further causes using an application program interface (API) associated with the SNMP 'GET' operation in the retrieving.

10. The apparatus as recited in claim 1, further comprising:
converting one or more IPFIX information elements into one or more corresponding MIB variables;
wherein exporting the IPFIX record data structure includes exporting the one or more corresponding MIB variables encoded in the IPFIX record data structure.

11. A method for exporting network management information, comprising the steps of:
receiving a command to collect a unique object identifier that represents a unique management information base (MIB) object;
wherein the unique object identifier is a MIB object identifier (OID);
retrieving, in response to receiving the command, a Simple Network Management Protocol (SNMP) MIB variable or table that corresponds to the MIB object;
creating an Internet Protocol Flow Information Export (IPFIX) template data structure that comprises the object identifier;
wherein the object identifier is encoded in the IPFIX template data structure as a string;
wherein the string has a variable length; and
exporting the IPFIX record data structure with the encoded object identifier;
wherein an object value that corresponds to the object identifier that is encoded in the IPFIX template record data structure is exported with the IPFIX record data structure; and
wherein the receiving and exporting steps support a push transmission mode for exporting unsolicited data;
wherein a size of the string is encoded therewith as a prefix, which comprises a variable length information element that conforms to IPFIX variable length encoding;
wherein a router performs the receiving, retrieving, creating, and exporting.

12. The method as recited in claim 11 further comprising storing the IPFIX template record.

13. The method as recited in claim 11 wherein the variable length string conforms to one of a plurality of encoding formats wherein the plurality includes one or more Unicode transformation formats and wherein the one or more Unicode transmission formats comprise Unicode Transformation Format 8 (UTF-8).

14. The method as recited in claim 11 wherein the size of the string is selectively stored separately from the apparatus, or wherein the string comprises a NULL terminated string.

15. The method as recited in claim 14 wherein content of the variable length string that corresponds to the object identifier encodes a name or a number.

16. The method as recited in claim 11 further comprising retrieving using a SNMP 'GET' operation;
wherein the retrieving step comprises using an application program interface (API) associated with the SNMP 'GET' operation in the retrieving.

17. The method as recited in claim 11, further comprising the steps of:
converting one or more IPFIX information elements into one or more corresponding MIB variables;
wherein exporting the IPFIX record data structure includes exporting the one or more corresponding MIB variables encoded in the IPFIX record data structure.

18. A networking apparatus, comprising:
one or more processors;
means for receiving a command to collect a unique object identifier that represents a unique management information base (MIB) object;
wherein the unique object identifier is a MIB object identifier (OID);
means for retrieving, in response to the command, a Simple Network Management protocol (SNMP) MIB variable or table that corresponds to the MIB object;
means for creating an Internet Protocol Flow Information Export (IPFIX) template data structure that comprises the object identifier;
wherein the creating means encodes the object identifier in the IPFIX template data structure as a string;
wherein the string has a variable length; and
means for exporting the IPFIX record data structure with the encoded object identifier;
wherein an object value that corresponds to the object identifier that is encoded in the IPFIX template record data structure is exported with the IPFIX record data structure; and
wherein the receiving and exporting means support a push transmission mode for exporting unsolicited data;
wherein a size of the string is encoded therewith as a prefix, which comprises a variable length information element that conforms to IPFIX variable length encoding.

19. A system, comprising:

a network management station communicatively coupled to a network;

a networking device coupled to the network;

logic in the networking device and encoded in one or more tangible media for execution and when executed operable to:

receive a command to collect a unique object identifier that represents a unique management information base (MIB) object;

wherein the unique object identifier is a MIB object identifier (OID);

retrieving, in response to receiving the command, a Simple Network Management Protocol (SNMP) MIB variable or table that corresponds to the MIB object;

creating an Internet Protocol Flow Information Export (IPFIX) template data structure that comprises the object identifier;

wherein the object identifier is encoded in the IPFIX template data structure as a string;

wherein the string has a variable length; and exporting the IPFIX record data structure with the encoded object identifier;

wherein an object value that corresponds to the object identifier that is encoded in the IPFIX template record data structure is exported with the IPFIX record data structure; and wherein the receiving and exporting steps support a push transmission mode for exporting unsolicited data;

wherein a size of the string is encoded therewith as a prefix, which comprises a variable length information element that conforms to IPFIX variable length encoding.

20. The system as recited in claim 19 further comprising logic which when executed causes storing the IPFIX template data structure.

21. The system as recited in claim 19 further comprising logic which when executed causes retrieving using a SNMP 'GET' operation wherein an application program interface (API) associated with the SNMP 'GET' operation is used with the retrieving.

* * * * *